Patented May 3, 1949

2,469,150

UNITED STATES PATENT OFFICE 2,469,150

WIRE COATING COMPOSITIONS

Willis E. Boak, Burton, Ohio, assignor to The American Steel and Wire Company of New Jersey, a corporation of New Jersey No Drawing. Application September 4, 1947, Serial No. 772,205

3 Claims. (Cl. 106—228)

This invention relates to wire coating compositions and particularly to enamel compositions capable of replacing galvanized zinc as a wire coating.

Compositions of the present invention are especially suited for coating iron or steel wire for preventing corrosion or rusting. Inasmuch as such wire is frequently used for baling or package bands, the coating should withstand bending and have sufficiently high shear strength and coefficient of friction that knots in the wire have tensile strength approaching that of the wire, that is, being within about 85 per cent of the latter. In addition the coating must possess satisfactory adhesive qualities and impart a satisfactory resistance to corrosion or rusting.

The present application is a continuation-in-part of my earlier copending application Serial No. 521,273, filed February 5, 1944 (now abandoned), and assigned to the same assignee.

An object of the invention is to provide improved enamel coating compositions that may be used on wire in place of zinc coatings and have characteristics approaching those of zinc as respects adhesion, corrosion resistance, flexibility and shear strength.

Zinc has certain disadvantages as a coating material. It is expensive and likely at times to be in short supply. Zinc is an objectionable material when charged into open hearth furnaces; hence steel wire coated with zinc has little scrap value.

Accordingly, a further object of the invention is to provide improved wire coating compositions of inexpensive, relatively abundant materials that do not interfere with utilization of wire scrap.

Coating compositions of the present invention consist essentially of the following ingredients in the following proportions to make approximately 100 gallons:

| | | |
|---|---|---|
| Soft red iron oxide | lbs | 120 to 160 |
| Fibrous magnesium silicate | lbs | 10 to 40 |
| Litharge | lbs | 5 to 25 |
| Aluminum stearate | lbs | up to 4 |
| Varnish | gal | 75 to 85 |
| Thinner | gal | 10 to 15 |

Iron oxide is employed in the composition to furnish hardness in coating films and, in conjunction with resins in the varnish, to furnish strength.

Soft iron oxides operable in compositions of the present invention may be distinguished from harder, inoperable grades by the ease with which the material may be ground. A soft oxide ground in a pebble mill for 48 hours in a paint or varnish vehicle has a smooth, creamlike texture. A hard oxide so ground is harsh and grity. A recognized test in the paint industry is to grind the material under the conditions mentioned and to observe the texture by spreading the ground material on a glass plate with a spatula.

Therefore, I define the term "soft iron oxide" as used herein as meaning a substance having the chemical formula $Fe_2O_3$, plus minor impurities, and susceptible to grinding in a pebble mill in a paint or varnish vehicle for 48 hours to furnish a product that has a smooth, creamlike texture when spread on a glass plate with a spatula. I do not know of any mathematical scale by which this hardness difference may be expressed, although the materials usually may be distinguished by their source. Soft oxides used as pigments are usually precipitated from copperas solutions, while hard oxides are usually ground ore.

Fibrous magnesium silicate provides flexibilty in coating films. The grade employed is preferably that of needlelike particle structure having a specific gravity of around 2.85 and ground to a fineness of 325 mesh. Such material is available commercially under the trade name "Asbestine."

Litharge provides corrosion resistance and also assists in providing flexibility. Standard commercial grades may be employed.

Aluminum stearate is included in the composition to prevent "hardsettling" of the solid ingredients when the composition is shipped or stored in prepared liquid form. The material may be omitted from compositions that are used promptly after preparation, since it is of no benefit in the coated product.

The varnish is of an oil length of 8 to 18 gallons, the oil length of a varnish being the gallons of drying oil per 100 pounds of resin. A preferred varnish consists of "fine melt" Congo resin and linseed oil in the ratio of 100 pounds of resin to 15 gallons of oil (oil length of 15 gallons). The term "fine melt" indicates that the resin has been melted and heated to temperatures of 600° F. to 760° F. to promote chemical combination of the fatty acids and alcohols of the resin and boiling off of the excess resins to a 30% loss of weight. Examples of other operable resins are: rosin hardened with lime; rosin hardened with magnesia and lead or zinc oxide or both; Congo resin esterified with glycerin; ester gum; fossil resins, such as Batu; rosin reacted with maleic acid and an alcohol; and rosin reacted with phenol-formaldehyde. The last two listed are known in the trade respectively as "maleic modified resins" and "phenol-formaldehyde modified resins" and are available commercially from most resin manufacturers. Examples of other operable drying oils are tung oil or perilla oil. The oil length of the varnish is adjusted in accordance with the selection of resin and oil to furnish a coating having the desired hardness. In general, the higher the oil length, the softer the varnish and the less needed in the enamel.

Examples of suitable thinners are naphtha, such as Varnish Maker's and Painter's (V. M. & P.), toluol, xylol and certain mineral spirits, and numerous others that could be named. Thinners are employed in accordance with standard practice to provide a proper working viscosity and the exact selection or quantity is a matter of convenience to the user.

An example of a preferred enamel composition within the limits disclosed is as follows:

| | | |
|---|---|---|
| Soft red iron oxide | lbs. | 140 |
| Fibrous magnesium silicate | lbs. | 38 |
| Litharge | lbs. | 19¼ |
| Aluminum stearate | lbs. | 1 to 4 |
| Congo-linseed oil varnish of 15 gallon oil length | gallons | 80 |
| V. M. & P. naphtha | do | 12½ |

Enamel compositions of this formula and others within the ranges disclosed provide wire coatings of excellent adherance, flexibility and shear strength, and impart satisfactory corrosion resistance.

While I have disclosed but certain exemplary enamel compositions, it is apparent modifications may arise. Therefore, I do not wish to be limited by the disclosure set forth, but only by the scope of the appended claims.

I claim:
1. A coating composition adapted to produce a rust resisting coating on an iron wire, which consists of the following constituents in substantially the proportions indicated:

| | | |
|---|---|---|
| Soft red iron oxide | lbs. | 140 |
| Fibrous magnesium silicate | lbs. | 38 |
| Litharge | lbs. | 19¼ |
| Aluminum stearate | lbs. | 1 to 4 |
| Congo-linseed oil varnish of 15 gallon oil length | gallons | 80 |
| Varnish Maker's and Painter's Naphtha | do | 12½ |

2. A coating composition consisting of the following ingredients in the following proportions:

| | | |
|---|---|---|
| Soft red iron oxide | lbs. | 120 to 160 |
| Fibrous magnesium silicate | lbs. | 10 to 40 |
| Litharge | lbs. | 5 to 25 |
| Aluminum stearate | lbs. | 0 to 4 |
| Varnish | gal. | 75 to 85 |
| Thinner | gal. | 10 to 15 | said varnish consisting of a resin of the group which consists of Congo resin, hardened rosin and ester gum and a drying oil and being of an oil length of 8 to 18 gallons.

3. A coating composition consisting of the following ingredients in the following proportions:

| | | |
|---|---|---|
| Soft red iron oxide | lbs. | 120 to 160 |
| Fibrous magnesium silicate | lbs. | 10 to 40 |
| Litharge | lbs. | 5 to 25 |
| Aluminum stearate | lbs. | 0 to 4 |
| Congo-linseed oil varnish of 8 to 18 gallon oil length | gal. | 75 to 85 |
| Varnish Maker's and Painter's Naphtha | gal. | 10 to 15 |

WILLIS E. BOAK.

No references cited